US008739067B2

(12) United States Patent
Miyazaki et al.

(10) Patent No.: US 8,739,067 B2
(45) Date of Patent: May 27, 2014

(54) INFORMATION DISPLAY DEVICE, INFORMATION DISPLAY METHOD, AND PROGRAM

(75) Inventors: Reiko Miyazaki, Tokyo (JP); Tatsushi Nashida, Kanagawa (JP); Kouichi Matsuda, Tokyo (JP)

(73) Assignee: Sony Corporation, Tokyo (JP)

( * ) Notice: Subject to any disclaimer, the term of this patent is extended or adjusted under 35 U.S.C. 154(b) by 913 days.

(21) Appl. No.: 12/494,483

(22) Filed: Jun. 30, 2009

(65) Prior Publication Data

US 2010/0005418 A1 Jan. 7, 2010

(30) Foreign Application Priority Data

Jul. 4, 2008 (JP) ................................ P2008-175840

(51) Int. Cl.
*G06F 3/0481* (2013.01)

(52) U.S. Cl.
USPC ........... 715/823; 715/810; 715/834; 715/835; 715/838; 725/52

(58) Field of Classification Search
CPC .............................. G06F 3/0481; G06F 3/0482
USPC ....................................................... 715/823
See application file for complete search history.

(56) References Cited

U.S. PATENT DOCUMENTS

| | | | | |
|---|---|---|---|---|
| 5,499,330 | A | * | 3/1996 | Lucas et al. .................... 715/205 |
| 5,912,668 | A | * | 6/1999 | Sciammarella et al. ....... 715/788 |
| 5,973,691 | A | * | 10/1999 | Servan-Schreiber ......... 715/803 |
| 6,069,606 | A | * | 5/2000 | Sciammarella et al. ....... 345/660 |
| 6,160,551 | A | | 12/2000 | Naughton et al. |
| 6,466,237 | B1 | * | 10/2002 | Miyao et al. ................... 715/838 |
| 6,570,582 | B1 | * | 5/2003 | Sciammarella et al. ....... 345/660 |
| 6,734,859 | B2 | * | 5/2004 | Hayashi et al. ................ 345/475 |
| 6,788,288 | B2 | * | 9/2004 | Ano ............................... 345/157 |
| 6,973,628 | B2 | * | 12/2005 | Asami ............................ 715/838 |

(Continued)

FOREIGN PATENT DOCUMENTS

| | | |
|---|---|---|
| EP | 1 028 570 A1 | 8/2000 |
| EP | 1 051 034 A1 | 11/2000 |

(Continued)

OTHER PUBLICATIONS

European Search Report dated Feb. 22, 2010, in EP 09 25 1681.

(Continued)

*Primary Examiner* — William Bashore
*Assistant Examiner* — Reza Nabi
(74) *Attorney, Agent, or Firm* — Sherr & Jiang, PLLC

(57) ABSTRACT

An information display device includes: an image display unit that displays a plurality of images in a spiral manner according to a predetermined order; an operation information input, unit that, inputs operation information for the plurality of images; and a display processing unit that displays the plurality of images on the image display unit such that, in accordance with movement angle information and angular velocity information obtained from the operation information, the plurality of images are moved in a generally circumferential direction of a spiral formed of the plurality of images. Thus, the spirally arranged images are moved in the generally circumferential direction of the spiral, in accordance with the movement angle information and the angular velocity information obtained from the operation information. Therefore, compared to a case where an up-down-left-right key or the like is used, a particular one of the images can be selected through intuitive operation.

20 Claims, 10 Drawing Sheets

(56) References Cited

U.S. PATENT DOCUMENTS

| | | | |
|---|---|---|---|
| 6,978,472 B1* | 12/2005 | Nashida et al. | 725/52 |
| 7,139,006 B2* | 11/2006 | Wittenburg et al. | 345/679 |
| 7,460,140 B2* | 12/2008 | Hayashi et al. | 345/698 |
| 7,581,195 B2* | 8/2009 | Sciammarella et al. | 715/838 |
| 7,607,150 B1* | 10/2009 | Kobayashi et al. | 725/41 |
| 7,610,599 B1* | 10/2009 | Nashida et al. | 725/38 |
| 7,937,726 B2* | 5/2011 | Nashida et al. | 725/46 |
| 7,958,456 B2* | 6/2011 | Ording et al. | 715/784 |
| 2003/0184525 A1 | 10/2003 | Tsai | |
| 2005/0010955 A1* | 1/2005 | Elia et al. | 725/88 |
| 2005/0160377 A1* | 7/2005 | Sciammarella et al. | 715/838 |
| 2006/0031786 A1* | 2/2006 | Hillis et al. | 715/863 |
| 2006/0055662 A1 | 3/2006 | Rimas-Ribikauskas et al. | |
| 2006/0125799 A1* | 6/2006 | Hillis et al. | 345/173 |
| 2006/0248475 A1* | 11/2006 | Abrahamsson | 715/835 |
| 2006/0268100 A1* | 11/2006 | Karukka et al. | 348/14.01 |
| 2007/0085841 A1 | 4/2007 | Tsuk et al. | |
| 2007/0120856 A1 | 5/2007 | De Ruyter et al. | |
| 2007/0150830 A1* | 6/2007 | Ording et al. | 715/784 |
| 2007/0236475 A1* | 10/2007 | Wherry | 345/173 |
| 2007/0290999 A1* | 12/2007 | Cho et al. | 345/158 |
| 2008/0062141 A1* | 3/2008 | Chandhri | 345/173 |
| 2008/0066013 A1 | 3/2008 | Brodersen et al. | |
| 2008/0134078 A1* | 6/2008 | Han | 715/784 |
| 2008/0211784 A1* | 9/2008 | Hotelling et al. | 345/173 |
| 2008/0211785 A1* | 9/2008 | Hotelling et al. | 345/173 |
| 2009/0198359 A1* | 8/2009 | Chaudhri | 700/94 |
| 2009/0265658 A1* | 10/2009 | Klishko et al. | 715/786 |
| 2010/0005418 A1* | 1/2010 | Miyazaki et al. | 715/823 |
| 2010/0156806 A1* | 6/2010 | Stallings | 345/173 |
| 2010/0315438 A1* | 12/2010 | Horodezky et al. | 345/661 |
| 2010/0318908 A1* | 12/2010 | Neuman et al. | 715/716 |
| 2010/0318928 A1* | 12/2010 | Neuman et al. | 715/769 |
| 2011/0057953 A1* | 3/2011 | Horodezky | 345/647 |

FOREIGN PATENT DOCUMENTS

| | | |
|---|---|---|
| JP | 08-234952 | 9/1996 |
| JP | 10-161628 | 6/1998 |
| JP | 2002-074322 | 3/2002 |
| JP | 2002-157077 | 5/2002 |
| JP | 2003-162373 | 6/2003 |
| JP | 2007-510215 | 4/2007 |
| JP | 2007-141272 | 6/2007 |
| JP | 2008-033695 | 2/2008 |
| WO | WO 00/33572 | 6/2000 |
| WO | WO 02/39712 A2 | 5/2002 |
| WO | WO-03/073411 | 9/2003 |
| WO | WO 2005/043373 A1 | 5/2005 |
| WO | WO 2008/030972 A1 | 3/2008 |

OTHER PUBLICATIONS

Communication pursuant to Article 94(3) EPC from the European Patent Office issued on Apr. 1, 2011, in EP 09 251 681.4.

Office Action from the European Patent Office for EP 09 251 681.4 dated Dec. 1, 2011.

* cited by examiner

INFORMATION DISPLAY DEVICE, INFORMATION DISPLAY METHOD, AND PROGRAM

BACKGROUND OF THE INVENTION

1. Field of the Invention

The present invention relates to an information display device, an information display method, and a program.

2. Description of the Related Art

In order to simultaneously display on a display screen a lot of images generated according to a predetermined order, such as time series data, while maintaining the predetermined order, there are known information display devices that display a lot of images by arranging them in a three-dimensional spiral (refer to WO 00/33572).

SUMMARY OF THE INVENTION

However, when a particular image is selected from a lot of images that are spirally arranged, it is necessary to select the particular image through operation of an up-down-left-right key or the like. Therefore, when the particular image is selected, it is necessary to move a lot of the images in a generally circumferential direction of the spiral (or rotate the spiral) with respect to a focus display area that is fixed on the display screen, or it is necessary to move a movable focus display frame in the generally circumferential direction of the spiral. In this case, through the operation of the up-down-left-right key or the like, a lot of the images are moved in the generally circumferential direction of the spiral, or the focus display frame is moved. As a result, the particular image cannot be selected by intuitive operation. In addition, many operation steps (time) are required to select the particular image.

It is desirable to provide an information display device, an information display method, and a program that are capable of selecting a particular image through intuitive operation from among a plurality of images that are spirally arranged.

According to a first embodiment of the present invention, there is provided an information display device that includes: an image display unit that displays a plurality of images in a spiral manner according to a predetermined order; an operation information input unit that inputs operation information for the plurality of images; and a display processing unit that displays the plurality of images on the image display unit such that, in accordance with movement angle information and angular velocity information obtained from the operation information, the plurality of images are moved in a generally circumferential direction of a spiral formed of the plurality of images.

With the above configuration, in accordance with the movement angle information and the angular velocity information obtained from the operation information, the spirally arranged images are moved in the generally circumferential direction of the spiral and displayed. Therefore, compared to a case where an up-down-left-right key or the like is used, a particular one of the images can be selected through intuitive operation.

The display processing unit may display, at a predetermined position of the image display unit, an enlarged display area, in which at least one of the plurality of images is enlarged and displayed, and may display the plurality of images on the image display unit such that, in accordance with the movement angle information and the angular velocity information obtained from the operation information, the plurality of images are moved in the generally circumferential direction of the spiral formed of the plurality of images, and the image arranged in the enlarged display area is enlarged and displayed in accordance with the movement of the plurality of images. Thus, the image that is arranged in the enlarged display area in accordance with the movement of the plurality of images is enlarged and displayed. Therefore, a particular one of the images can be selected after confirming it.

The display processing unit may display the plurality of images on the image display unit such that, in accordance with the movement angle information and the angular velocity information obtained from the operation information that is consecutively input, the plurality of images are consecutively moved in the generally circumferential direction of the spiral formed of the plurality of images. Thus, in accordance with the movement angle information and the angular velocity information obtained from the operation information that is consecutively input, the plurality of images are consecutively moved in the generally circumferential direction of the spiral and displayed. Therefore, a particular one of the images can be selected through consecutive operations.

The display processing unit may display the plurality of images on the image display unit such that, in accordance with the movement angle information and the angular velocity information obtained from the operation information, the plurality of images are continuously moved in the generally circumferential direction of the spiral formed of the plurality of images, and movement speed is gradually reduced. Thus, in accordance with the movement angle information and the angular velocity information obtained from the input operation information, the plurality of images are continuously moved in the generally circumferential direction of the spiral, and displayed while the movement speed is gradually reduced. Therefore, a particular one of the images can be selected efficiently.

The display processing unit may display the plurality of images on the image display unit such that, while the plurality of images are continuously moved in the generally circumferential direction of the spiral formed of the plurality of images, the movement of the plurality of images is stopped in accordance with a movement stop instruction that is input as the operation information to stop the movement. Thus, in accordance with the movement stop instruction that is input while the images are continuously moved, the movement of the images is stopped and the images are displayed. Therefore, a particular one of the images can he selected efficiently.

The display processing unit may display the plurality of images on the image display unit such that, in accordance with an image selection instruction that is input as the operation information to select one of the plurality of images, the plurality of images are moved in the generally circumferential direction of the spiral formed of the plurality of images and the selected one of the images is arranged in the enlarged display area. Thus, in accordance with the input image selection instruction, the plurality of images are moved in the generally circumferential direction of the spiral, and the selected one of the images is arranged and displayed in the enlarged display area. Therefore, a particular one of the images can be selected through intuitive operation.

The display processing unit may display the plurality of images on the image display unit such that, in the order of the predetermined order of the plurality of images, a first image is larger than a second image, and the first image is brighter than the second image. Thus, the plurality of images are overlapped and displayed such that each of the images can be identified. Therefore, a lot of the images can be simultaneously displayed while maintaining the order state.

The plurality of images may be spirally arranged according to a time series order. The image display unit and the operation information input unit may be one of a touch panel and a touch screen.

According to a second embodiment of the present invention, there is provided an information display method for displaying a plurality of images in a spiral manner according to a predetermined order. The information display method includes the steps of: inputting operation information for the plurality of images; and displaying the plurality of images such that the plurality of images are moved in a generally circumferential direction of a spiral formed of the plurality of images, in accordance with movement angle information and angular velocity information obtained from the operation information.

According to a third embodiment of the present invention, there is provided a program that causes a computer to execute the information display method according to the second embodiment of the present invention.

According to the embodiments of the present invention, there are provided an information display device, an information display method and a program that are capable of selecting a particular image through intuitive operation from among a plurality of images that are spirally arranged.

DETAILED DESCRIPTION OF THE PREFERRED EMBODIMENTS

Figure 1:
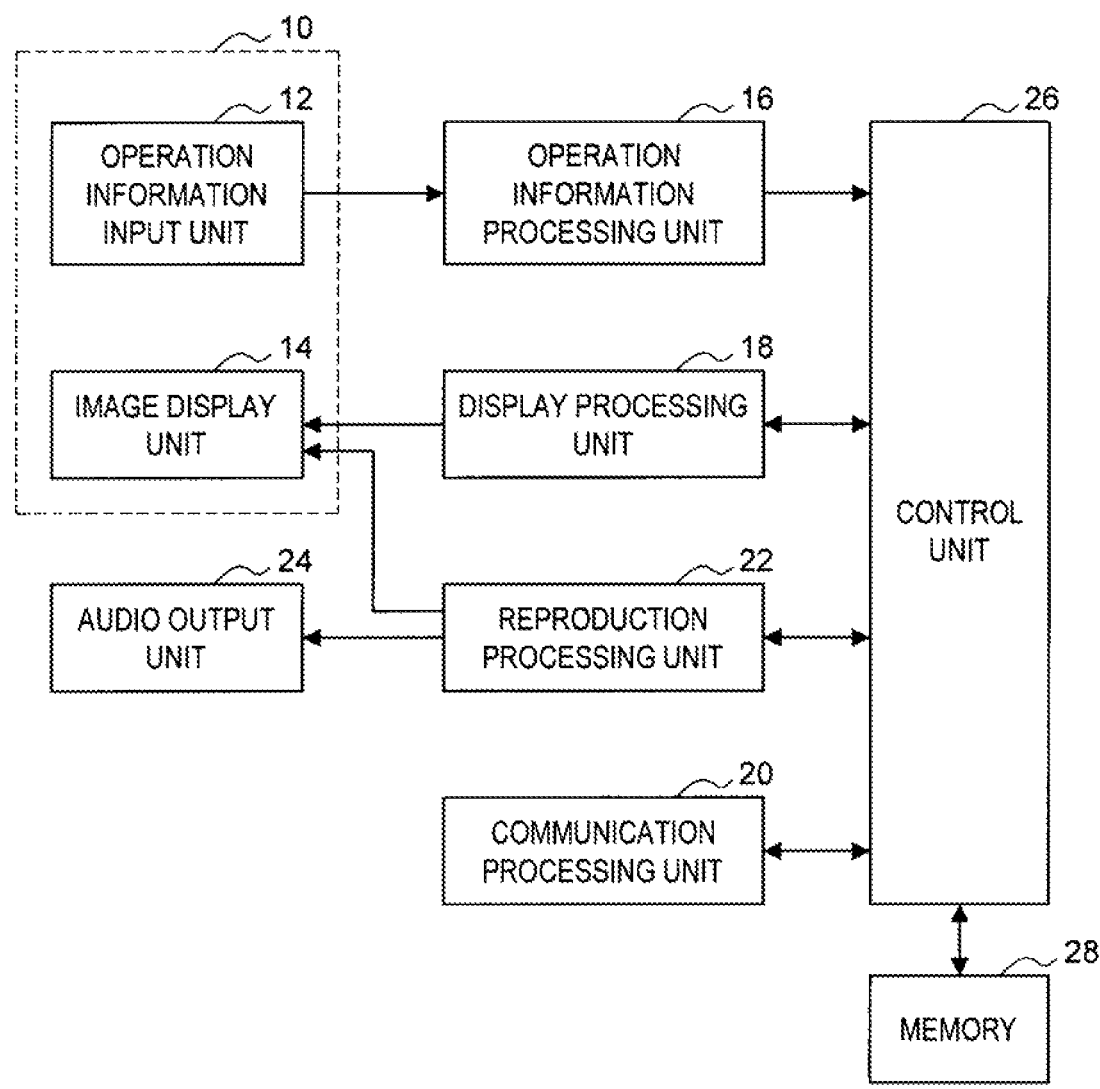
FIG. 1 is a block diagram illustrating a functional configuration of an information display terminal according to an embodiment of the present invention.

Hereinafter, preferred embodiments of the present invention will be described in detail with reference to the appended drawings. Note that, in the specification and the appended drawings, structural elements that have substantially the same function and structure are denoted with the same reference numerals, and repeated explanation of these structural elements is omitted.

Configuration of Information Display Terminal

FIG. 1 is a block diagram illustrating a functional configuration of an information display terminal according to an embodiment of the present invention. The information display terminal (information display device) according to the embodiment of the present invention is a mobile information display terminal including a personal digital assistant (PDA), a mobile telephone, a music playback device and the like. As shown in FIG. 1, the information display terminal includes a touch panel 10 (an operation information input unit 12, an image display unit 14), an operation information processing unit 16, a display processing unit 18, a communication processing unit 20, a reproduction processing unit 22, an audio output unit 24, a control unit 26, and a memory 28.

The touch panel 10 is a pointing device that is used to input position information on the display screen, by combining, for example, a display screen of a liquid crystal display and a contact sensor such as a matrix switch. An object of a graphical user interface (GUI), for example, is displayed on the display screen of the touch panel 10. If an input pen 30 or a user's finger touches the display screen, the contact position is detected by the contact sensor provided on the display screen, and the position information on the display screen is input. Thus, the touch panel 10 functions as the operation information input unit 12 that inputs operation information for a plurality of images 2, and as the image display unit 14 that displays the plurality of images 2 in a spiral manner according to a predetermined order.

The operation information processing unit 16 processes the operation information input to the operation information input unit 12, and obtains movement angle information, angular velocity information, angular acceleration information and the like, which will be described later. The display processing unit 18 causes the image display unit 14 to display the plurality of images 2, in accordance with the operation information input to the operation information input unit 12. For example, the display processing unit 18 causes the image display unit 14 to display the images 2 such that the images 2 move in a generally circumferential direction of the spiral formed by the images 2. The communication processing unit 20 transmits and receives image data, instruction information and the like to and from an external device such as a television terminal, a set top box (STB) or a personal video recorder (PVR). The reproduction processing unit 22 plays back video, still images, audio content and the like acquired from the external device. The audio output unit 24 outputs audio information etc. contained in the audio content. The control unit 26 controls the entire information display terminal through control of other structural elements. The memory 28 stores various types of data including image data, and a processing program for executing an information display method to be described later.

Display Screen of Information Display Terminal

Figure 2:
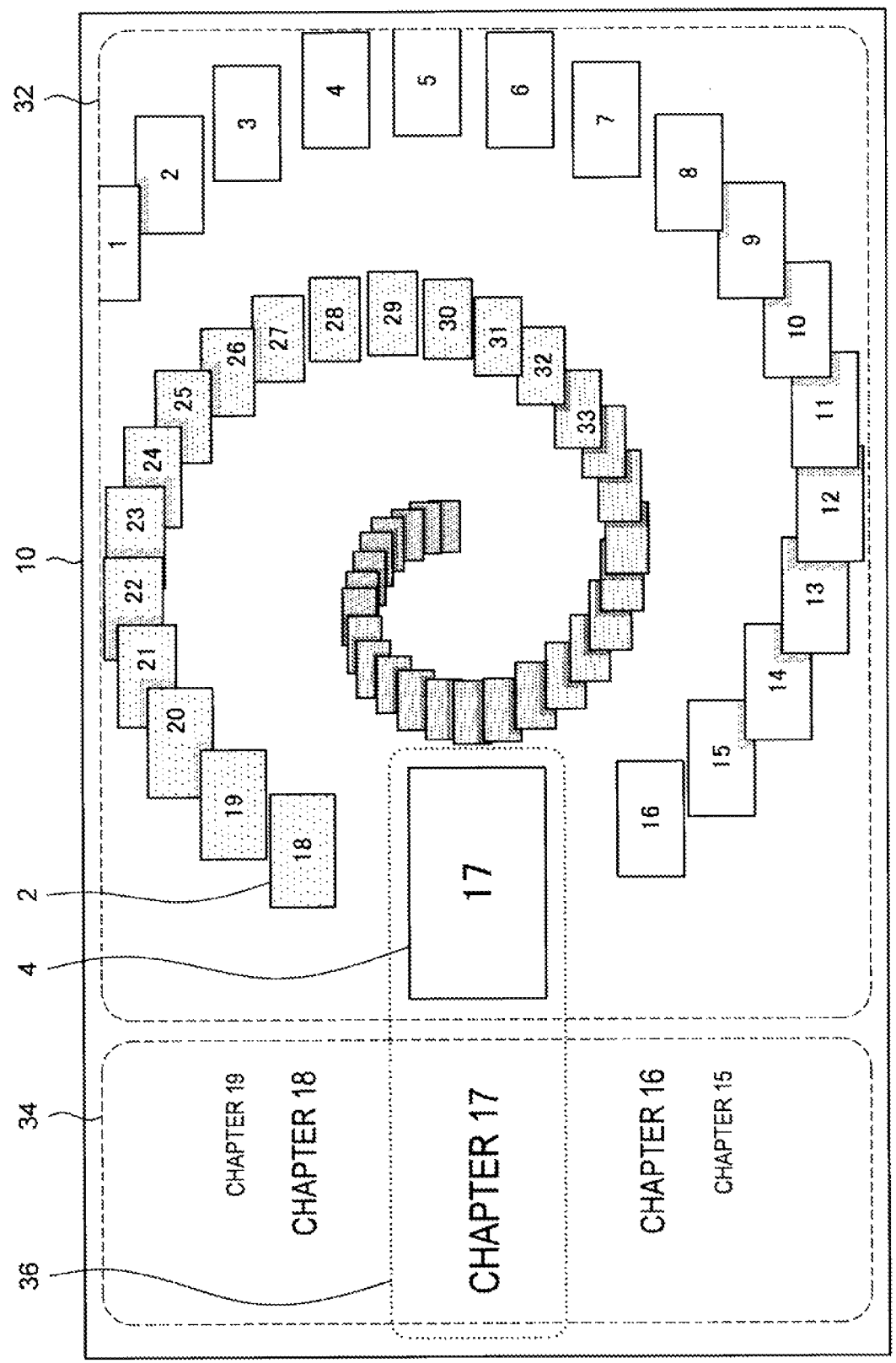
FIG. 2 is an explanatory diagram illustrating an example of a display screen of the information display terminal.

FIG. 2 is an explanatory diagram illustrating an example of a display screen of the information display terminal. FIG. 2 illustrates a case where thumbnail images of a program content recorded by a PVR or the like are displayed as the images 2.

The images 2 are extracted from the program content by the PVR, and acquired, as image data together with image attribute information, by the information display terminal via the communication processing unit 20. In the following, a case will be described in which the images 2 are representative images extracted from each chapter of the recorded program (recorded image) content. In order to identify each chapter as well as to indicate the title and the recording time of each of the images 2, the image attribute information is extracted from, for example, electronic program information of the program content, as chapter identification information, a chapter title, a recording time (chapter number), and the like. The images 2 follow a order corresponding the recording time of each chapter (chapter number) included in the attribute information of each of the images 2.

Note that the images 2 may be representative images that are respectively extracted from a plurality of recorded program contents, a plurality of shot video/still image contents, and recorded video/still image contents corresponding to a plurality of audio contents. In these cases, the images 2 follow a order of the recording time, the shooting date and time, the playback order (track order) etc.

As shown in FIG. 2, the display screen is provided with a main display area 32 for displaying the images 2, a title display area 34 for displaying the title of each of the images 2, and a focus display area 36 for displaying an enlarged image 4 of a particular one of the images 2 (note that the term "images 2" is genetically used to include the enlarged image 4). In the example shown in FIG. 2, the main display area 32 is arranged on the right side of the display screen, and the title display area 34 and the focus display area 36 are arranged on the left side of the display screen. In the example shown in FIG. 2, it is assumed that a right-handed user performs operation. When a left-handed user performs operation, operability can he improved by arranging the title display area 34 and the focus display area 36 on the right side of the display screen.

In the main display area 32, the images 2 are displayed in a counterclockwise spiral according to a predetermined order. In FIG. 2, the order of order (chapter number 1, 2, . . . ) of each of the images 2 is displayed, instead of a specific image content. In the example shown in FIG. 2, the images 2 are displayed in a time series such that the images 2 with an earlier recording time (images with a smaller chapter number) are arranged on the outer peripheral side (the near side) of the spiral. The images 2 are partially overlapped and arranged in a three-dimensional spiral shape. Except the image 4 that is enlarged and displayed in the focus display area 36, the images 2 with an earlier recording time are displayed larger and more brightly. Thus, the images 2 are displayed in an overlapped manner such that each of the images 2 can be identified. Therefore, many images 2 can foe simultaneously displayed on the touch panel 10 while maintaining the order of the order.

The title display area 34 displays the titles of the images 2 that are arranged in the focus display area 36 and in the vicinity of the focus display area 36. The closer the images 2 are arranged to the focus display area 36, the larger and more brightly the titles of the images 2 are displayed. The further away the images 2 are arranged from the focus display area 36, the smaller and less brightly the titles of the images 2 are displayed. In the focus display area 36 that is partially overlapped with the main display area 32 and the title display area 34, a particular one of the images 2 arranged in the focus display area 36 is enlarged and displayed as the image 4.

Information Display Method

Hereinafter, an information display method performed by the information display terminal will be described with reference to FIG. 3 to FIG. 10. Note that, for explanatory convenience, the display screen shown in FIG. 2 is schematically illustrated in FIG. 3 to FIG. 10.

Figure 3:
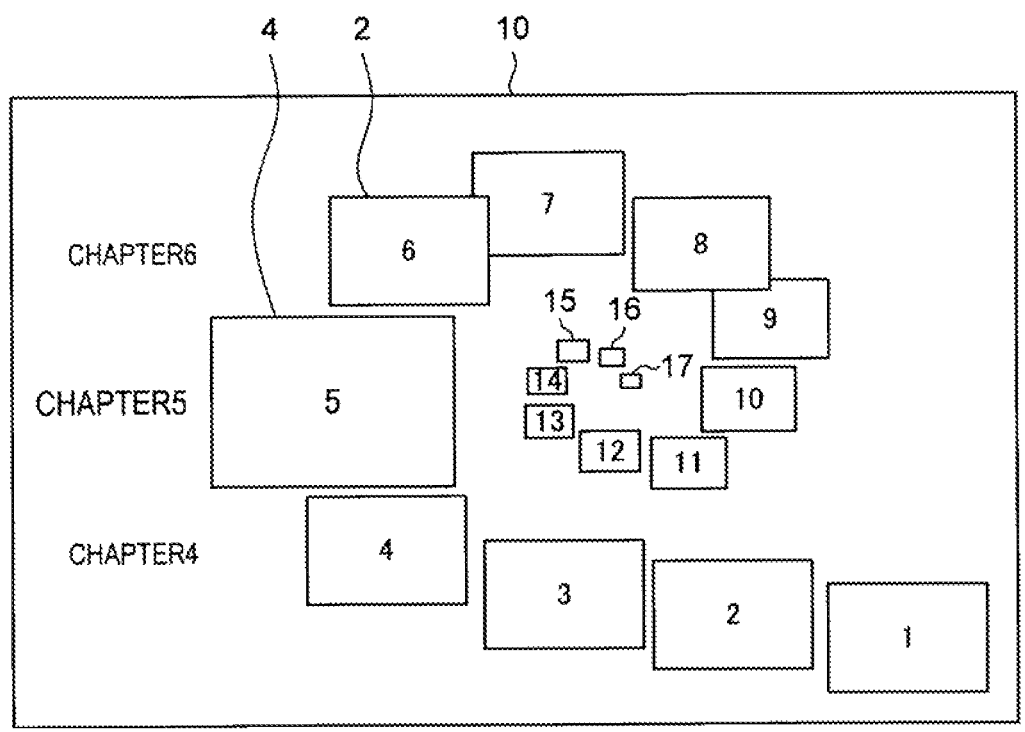
FIG. 3 is an explanatory diagram illustrating an operation (an initial display screen) of the information display terminal.

FIG. 3 is an explanatory diagram illustrating an operation (an initial display screen) of the information display terminal. In order to display the display screen shown in FIG. 3, the information display terminal obtains image data for the images 2, together with their attribute information, from the PVR via the communication processing unit 20, and stores them in the memory 28. The information display terminal creates a order table that indicates the order in accordance with the recording time (chapter number) of the images 2, and stores the order table in the memory 28. Further, in order to display the images 2 in a spiral manner, the information display terminal sets display attribute information including the arrangement on the display screen, the display size and the display brightness, for each of the images 2 arranged on the spiral formed by the images 2 (hereinafter also referred to as the image spiral), and stores the display attribute information in the memory 28.

In order to display the images 2, the display processing unit 18 first reads image data of the images 2 to be set as display targets from the memory 28, based on the order table. For example, the display processing unit 18 selects the images 2 to be set as the display targets, using the image 4 (reference image) arranged in the focus display area 36 as a reference. In an example shown in FIG. 3, the image with the fifth oldest recording time (the image of chapter 5) is used as the reference image, and seventeen of the images 2 (the images of chapter 1 to chapter 17), which include four of the images 2 (the images of chapter 1 to chapter 4) that are older than the reference image and twelve of the images 2 (the images of chapter 6 to chapter 17) that are newer than the reference image, are selected as the display targets. In the description below, a case will foe described in which the image 4 arranged in the focus display area 36 is used as the reference image. However, the image 2 that is arranged on the outermost peripheral side of the image spiral (the image of chapter 1 in FIG. 3), or the image 2 that is arranged on the innermost peripheral side (the image of chapter 17 in FIG. 3) may be used as the reference image.

If there are no display target images 2 that are selected using the reference image as the reference (for example, in the example shown in FIG. 3, four of the images 2 that are older than the reference image when the image of chapter 1 is displayed as the reference image), blank images may be displayed, or no images 2 may be displayed. Further, a loop order may be used for the images 2 so that the oldest one of the images 2 (the image with the smallest chapter number) is displayed following the newest one of the images 2 (the image with the largest chapter number).

Next, for the display target images, the display processing unit 18 generates display images from image data, based on the order of the reference image and the display attribute information in accordance with the arrangement of each of the images 2 on the image spiral that is determined according to the order of the reference image. Then, for the display target images 2, the display processing unit 18 displays on the touch panel 10 the display images in a spiral manner in the order of the recording time (chapter number).

Figure 4A:
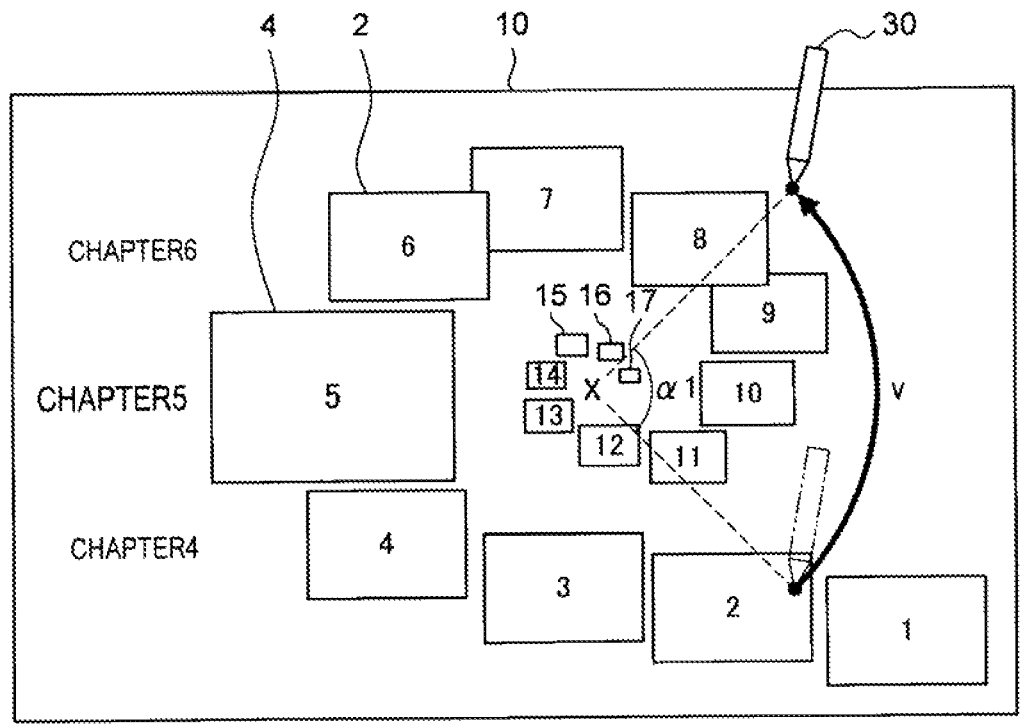
FIG. 4A is an explanatory diagram illustrating an operation (movement of images) of the information display terminal.
Figure 4B:
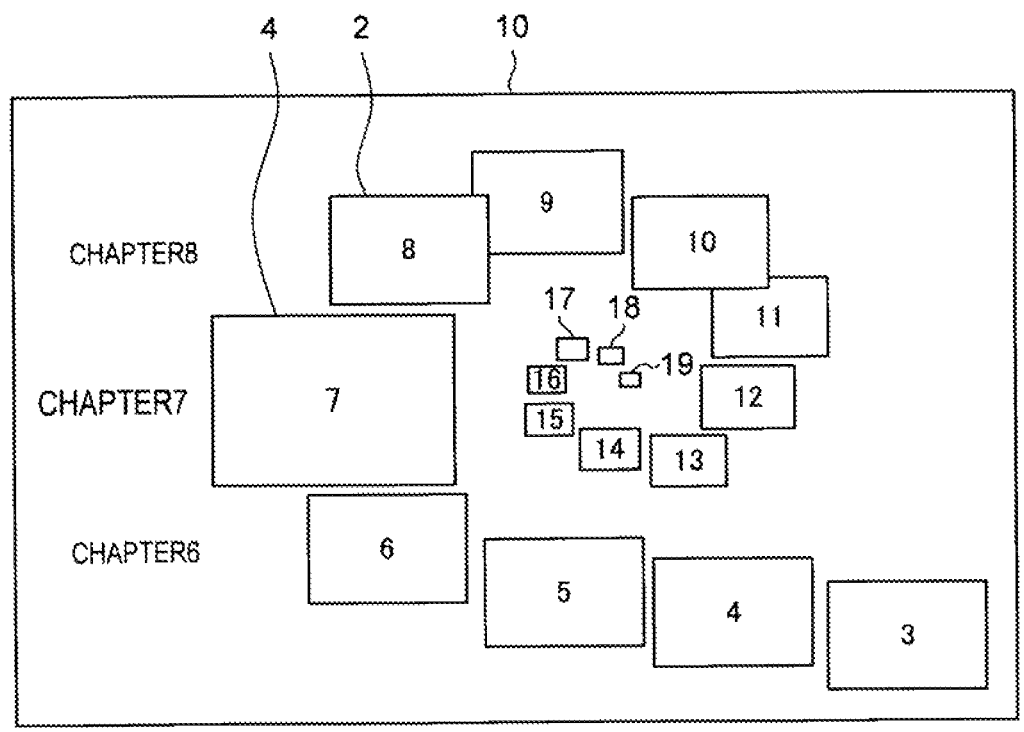
FIG. 4B is an explanatory diagram illustrating an operation (movement of images) of the information display terminal.

FIG. 4A and FIG. 4B are explanatory diagrams each illustrating an operation (movement of images) of the information display terminal. FIG. 4A and FIG. 4B each show a case where the images 2 are displayed by moving the images 2 counterclockwise in a generally circumferential direction of the image spiral, from the state of the initial display screen shown in FIG. 3, in accordance with movement angle information $\Delta\alpha$ and angular velocity information v obtained from operation information. Note that the phrase "moving the images 2 in a generally circumferential direction" means that the images 2 are moved between an inner circumference end and an outer circumference end of the image spiral while maintaining the predetermined order of the images 2 and the shape of the image spiral.

In order to move the images 2, the user uses the touch panel 10 to input the movement angle. In an example shown in FIG. 4A, the input pen 30 is used to draw an arc generally centered on a reference point X, which is the center of the image spiral, on the touch panel 10 at a certain speed. Thus, a total angle of $\alpha 1$ is input as an angle of counterclockwise movement. In the description below, a case will be described in which, when an arc of an angle of $\alpha$ is drawn on the touch panel 10, movement angle information $\Delta\alpha 1$ of the total angle of $\alpha 1$ ($=\alpha$) is obtained. However, when the arc of the angle of $\alpha$ is drawn on the touch panel 10, the movement angle information $\Delta\alpha 1$ of the total angle of $\alpha 1$ ($\neq\alpha$, for example, $\alpha 1=\alpha/2$) that is converted from the angle of $\alpha$ in accordance with a predetermined reference may be obtained. In this case, for example, depending on the radius of the arc drawn on the touch panel 10, if the radius of the arc is relatively large, the movement angle information $\Delta\alpha 1$ of a relatively large total angle of $\alpha 1$ may be obtained.

After contact of the input pen 30 has first been detected on the touch panel 10, the operation information processing unit 16 obtains the movement angle information $\Delta\alpha$, in accordance with a movement locus of the contact position that is detected during a period from when a start of the movement of the contact position is detected to when an end of the movement is detected. The operation information processing unit 16 determines the end of the movement when the movement of the contact position is not detected for a predetermined number of detection cycles (for example, 1 second that corresponds to 10 detection cycles with respect to a detection cycle of 0.1 seconds) via the touch panel 10. Further, the operation information processing unit 16 obtains the movement angle information $\Delta\alpha$ and the angular velocity information v (a change amount of the movement angle information $\Delta\alpha$) at each detection cycle, from the position information about the contact position supplied from the touch panel 10 at each detection cycle, and the position information of the reference point X.

When a first contact is detected on a particular one of the images 2, if the start of the movement of the contact position is detected after detecting the first contact, the operation information processing unit 16 performs a movement process of the images 2. If, after detecting the first contact, there is no movement of the contact position and non-contact is detected, the operation information processing unit 16 performs a selection process for selecting a particular one of the images 2, which will be described later. In the description below, a case will be described in which the movement angle information $\Delta\alpha$ is obtained using the reference point X, which is the center of the image spiral, as an approximate center. However, the movement angle information $\Delta\alpha$ may be obtained using the first contact point as the reference.

Then, the display processing unit 18 displays the images 2 on the touch panel 10 such that the images 2 move in a generally circumferential direction of the image spiral in accordance with the movement angle information $\Delta\alpha$ and the angular velocity information v. In an example shown in FIG. 4B, the movement angle information $\Delta\alpha$ of the total angle of $\alpha 1$ is obtained, and the images 2 are moved counterclockwise by the total angle of $\alpha 1$ around the reference point X as the center in a generally circumferential direction of the image spiral, from the state of the initial display screen. In this case, the reference image is changed from the image of chapter 5 to the image of chapter 7 corresponding to the total angle of $\alpha 1$, and the display processing unit 18 displays a display screen in which the images of chapter 3 to chapter 19 are set as the display targets. If the image of chapter 7 is moved to the focus display area 36 in accordance with the movement angle information $\Delta\alpha$ (the total angle of $\alpha 1$) and displayed, the image of chapter 7 can be confirmed as the enlarged image 4.

At a predetermined time point after the first contact has been detected, for example, at a time point when a cumulative value of the movement angle information $\Delta\alpha$ at each detection cycle reaches $\alpha 1/2$, the display processing unit 18 displays on the touch panel 10, from the state of the initial display screen, a display screen in which the images of chapter 2 to chapter 18 are set as the display targets. More specifically, the display processing unit 18 moves the images 2 in a generally circumferential direction of the image spiral in conjunction with the input of the movement angle, and displays the images 2. A display process for the images 2 is the same as that of the initial display screen, except that the display target images are different from those of the initial display screen. Therefore, an explanation of the display process is omitted.

Figure 5A:
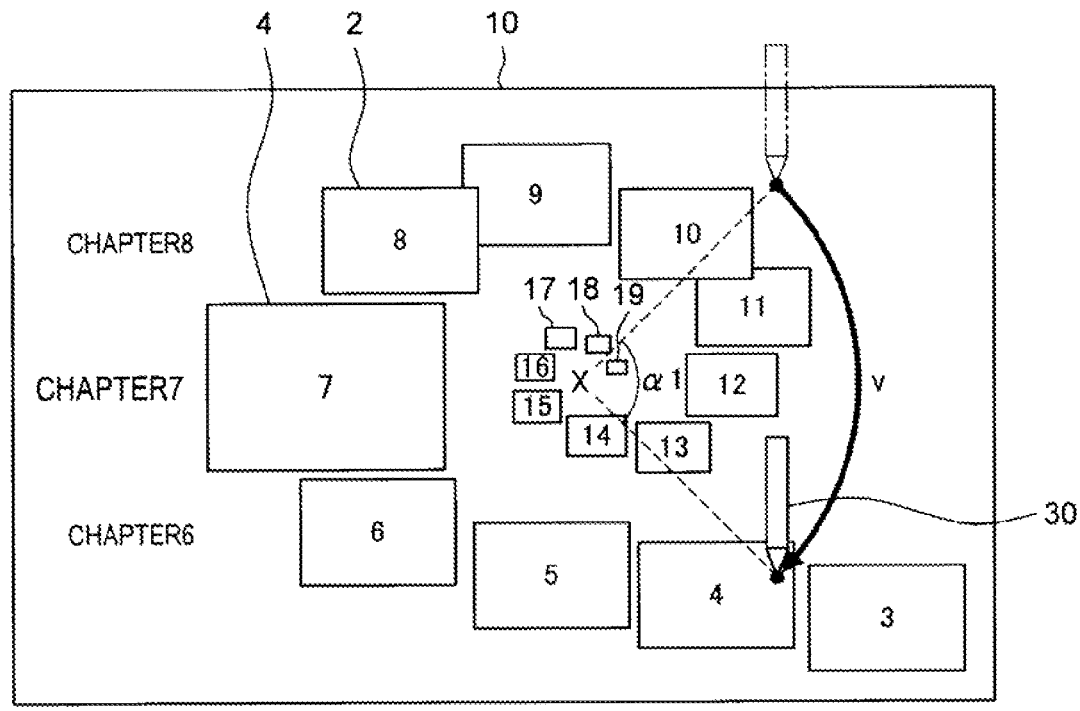
FIG. 5A is an explanatory diagram illustrating an operation (movement of images) of the information display terminal.
Figure 5B:
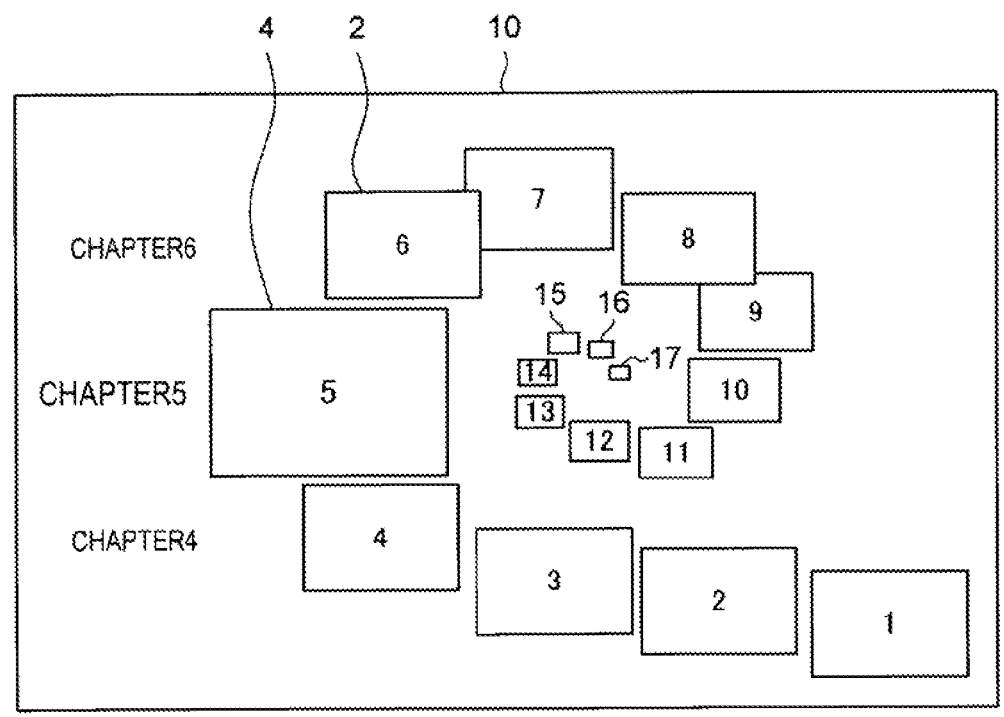
FIG. 5B is an explanatory diagram illustrating an operation (movement of images) of the information display terminal.

FIG. 5A and FIG. 5B are explanatory diagrams each illustrating an operation (movement of images) of the information display terminal. FIG. 5A and FIG. 5B each show a case where the images 2 are moved clockwise in a generally circumferential direction of the image spiral from the state of the display screen shown in FIG. 4B, in accordance with the movement angle information $\Delta\alpha$ and the angular velocity information v obtained from the operation information, and thereby displayed. A display process shown in FIGS. 5A and 5B is the same as that shown in FIG. 4A and FIG. 4B, except that the movement direction of the images 2 and the display target images 2 are different from those shown in FIG. 4A and FIG. 4B.

As described above, in accordance with the movement angle information $\Delta\alpha$ and the angular velocity information v, the spirally arranged images 2 are moved in the generally circumferential direction of the image spiral, and displayed. Therefore, compared to a case where an up-down-left-right key is used, a particular one of the images 2 can be selected through intuitive operation. In addition, because the image 4 arranged in the focus display area 36 is enlarged and displayed, the particular one of the images 2 can be selected after confirming it.

In the above description, the movement angle information $\Delta\alpha$ (the total angle of $\alpha 1<360°$) is obtained by drawing an arc on the touch panel 10. However, a case where the movement angle information $\Delta\alpha$ ($\alpha 1\geq 360°$) is obtained can also be explained in a similar way. In this case, the images 2 are moved in a generally circumferential direction of the image spiral by one full rotation or more, in accordance with the movement angle information $\Delta\alpha$, and then displayed. Accordingly, even when the images 2 that are separated from each other in terms of the order are selected, if a circle or a spiral (a vortex) is drawn without detaching the input pen 30 from the touch panel 10, the images 2 can be consecutively moved and a particular one of the images 2 can be selected.

Moreover, the images 2 may be spirally displayed according to a predetermined order that is determined as a certain time interval (for example, every 1 minute, or every 10 minutes). Then, each time a circle is drawn on the touch panel 10, the images 2 may be moved at a predetermined interval (for example, 10 minutes/one circle, or 100 minutes/one circle) and displayed. Thus, the movement of the images 2 is prescribed corresponding to a predetermined operation on the touch panel 10. Therefore, a particular one of the images 2 can be selected through intuitive operation.

Figure 6A:
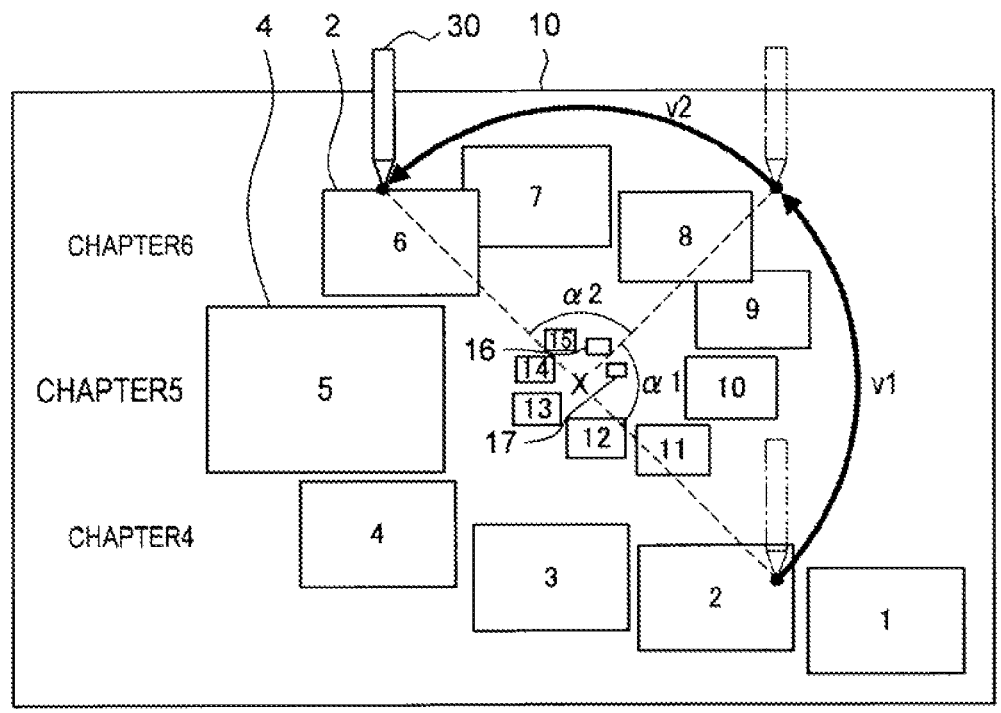
FIG. 6A is an explanatory diagram illustrating an operation (consecutive movement of images) of the information display terminal.
Figure 6B:
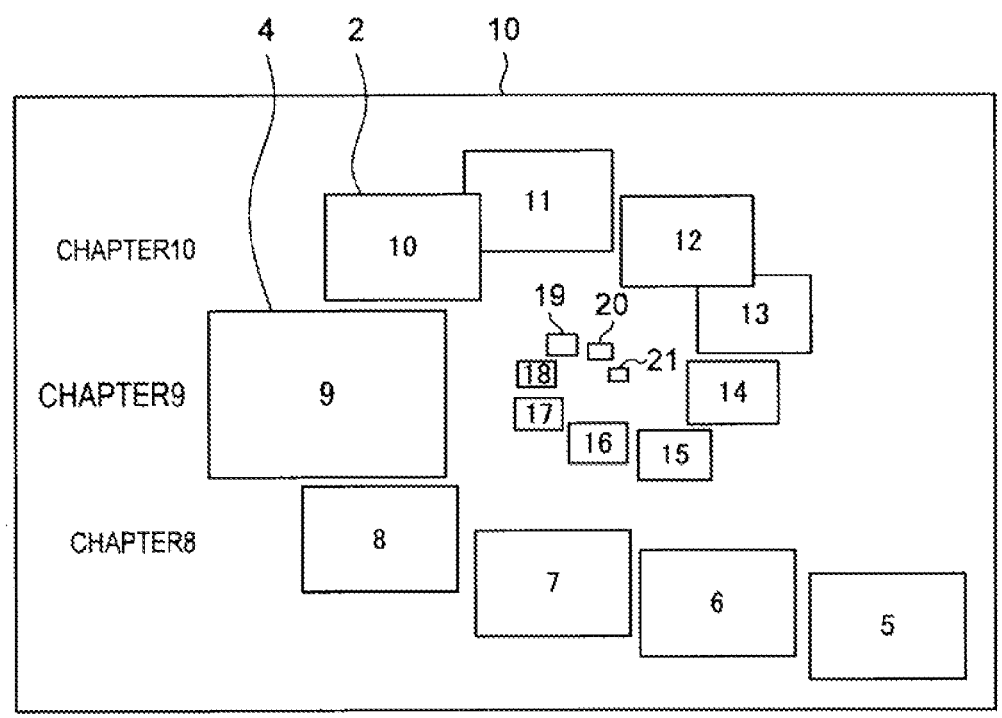
FIG. 6B is an explanatory diagram illustrating an operation (consecutive movement of images) of the information display terminal.

FIG. 6A and FIG. 6B are explanatory diagrams each illustrating an operation (consecutive movement of the images 2) of the information display terminal. FIG. 6A and FIG. 6B each show a case where the images 2 are consecutively moved in a generally circumferential direction of the image spiral from the state of the initial display screen shown in FIG. 3, in accordance with the movement angle information $\Delta\alpha$ and the angular velocity information v obtained from the operation information that is consecutively input, and thereby displayed.

In an example shown in FIG. 6A, two consecutive arcs, which are generally centered on the reference point X, are respectively drawn on the touch panel 10 at a predetermined speed using the input pen 30. Thus, the movement angle information $\Delta\alpha$ and the angular velocity information v1, v2 of the total angle of $\alpha1$, $\alpha2$ are respectively obtained counterclockwise.

After an end of the movement of the contact position of the input pen 30 has been detected on the touch panel 10, the operation information processing unit 16 obtains the movement angle information $\Delta\alpha$, in accordance with the movement locus of the contact position that is detected during a period from when a restart of the movement of the contact position is detected to when an end of the movement is detected without any detection of non-contact. The example shown in FIG. 6A corresponds to a case where, after the end of the movement of the contact position has been detected in the example shown in FIG. 4A, the movement, of the contact position is restarted while the input pen 30 is still in contact with the touch panel 10.

In the example shown in FIG. 6A, the movement angle information $\Delta\alpha$ and the angular velocity information v1 of the total angle of $\alpha1$ are obtained. First, in a similar manner to the case shown in FIG. 4B, the image of chapter 7 is enlarged and displayed as a reference image, and a display screen in which the images of chapter 5 to chapter 21 are set as display targets is displayed. Next, the movement angle information $\Delta\alpha$ and the angular velocity information v2 of the total angle of $\alpha2$ are obtained. As shown in FIG. 6B, the images 2 are moved counterclockwise by the total angle of $\alpha2$ around the reference point X in a generally circumferential direction of the image spiral from the state of the display screen shown in FIG. 4B. In this case, the reference image is changed from the image of chapter 7 to the image of chapter 9 in accordance with the total angle of $\alpha2$, and a display screen in which the images of chapter 5 to chapter 21 are set as display targets is displayed on the touch panel 10 by the display processing unit 18. In this situation, if the image of chapter 9 is moved to the focus display area 36 in accordance with the movement angle information $\Delta\alpha$ (the total angle of $\alpha1$, $\alpha2$) and displayed, the image of chapter 9 can be confirmed as the enlarged image 4. Note that a display process during a period when the reference image is shifted from the image of chapter 5 to the image of chapter 9 is the same as the display process shown in FIG. 4B.

As a consequence, in accordance with the movement angle information $\Delta\alpha$ (the total angle of $\alpha1$, $\alpha2$) and the angular velocity information v (v1, v2) that are obtained from the consecutively input operation information, the images 2 are consecutively moved in the generally circumferential direction of the spiral and displayed. Thus, a particular one of the images 2 can be selected through consecutive operations.

In a similar manner to the cases of FIG. 4A and FIG. 4B, a case where the images 2 are moved in a generally circumferential direction of the image spiral by one full rotation or more in accordance with the movement angle information $\Delta\alpha$ and displayed can also be explained in a similar way. Accordingly, even when the images 2 that are separated from each other in terms of the order are selected, if a circle or a spiral (a vortex) is drawn without detaching the input pen 30 from the touch panel 10 while confirming the enlarged image 4 by intermittently moving the input pen 30, the images 2 can be consecutively moved and a particular one of the images 2 can be selected.

In the above explanation, the movement angle information $\Delta\alpha$ (the total angle of $\alpha1$, $\alpha2$) is obtained by drawing consecutive arcs in the same direction on the touch panel 10. However, a case where the movement angle information $\Delta\alpha$ is obtained by drawing consecutive arcs in directions different from each other can also be explained in a similar way.

FIG. 7A to FIG. 7E are explanatory diagrams each illustrating an operation (continuous movement of images) of the information display terminal. FIG. 7A to FIG. 7E each show a case where the images 2 are continuously moved in a generally circumferential direction of the image spiral from the state of the initial display screen shown in FIG. 3, in accordance with the movement angle information $\Delta\alpha$ and angular velocity information v obtained from the operation information, and thereby displayed.

Figure 7A:
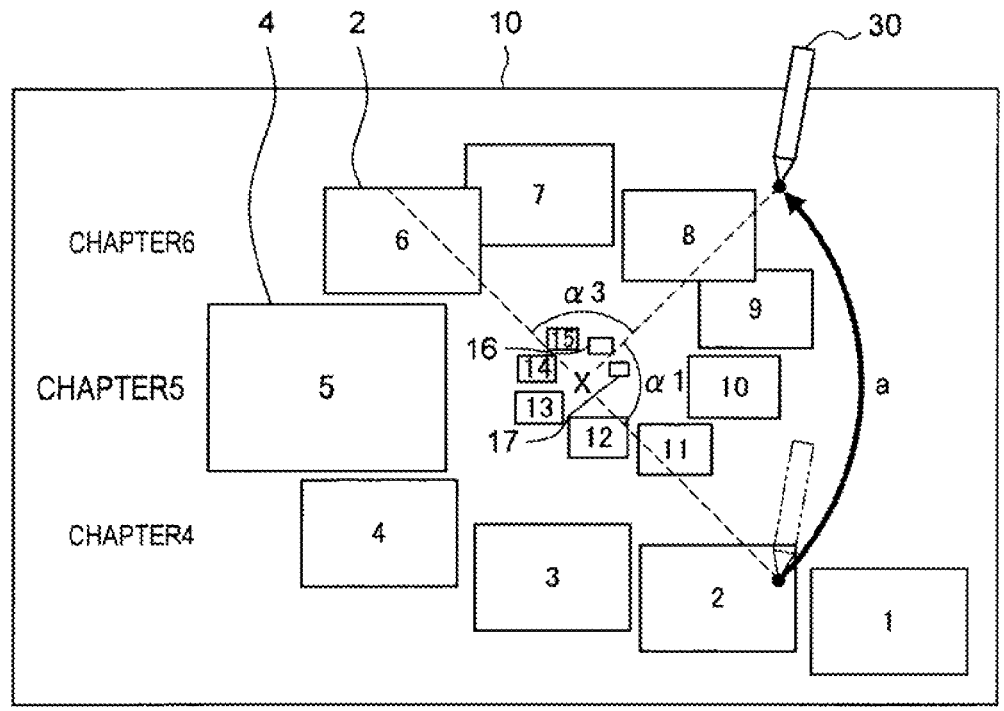
FIG. 7A is an explanatory diagram illustrating an operation (continuous movement of images) of the information display terminal.

In an example shown in FIG. 7A, an arc that is generally centered on the reference point X is drawn using the input pen 30 on the touch panel 10 with an acceleration a. Thus, the movement angle information $\Delta\alpha$ and the angular acceleration information a of the total angle of $\alpha1$ are respectively obtained counterclockwise. Further, movement angle information $\Delta\alpha'$ of a total angle of $\alpha3$ is obtained from the angular acceleration information a.

In a similar manner to the case shown in FIG. 4A, after contact of the input pen 30 has been detected on the touch panel 10, the operation information processing unit 16 obtains the movement angle information $\Delta\alpha$, in accordance with the movement locus of the contact position that is detected during a period from when start of the movement of the contact, position is detected to when non-contact is detected. Further, the operation information processing unit 16 obtains the movement angle information $\Delta\alpha$ and the angular acceleration information a (which corresponds to a change amount of the angular velocity information v) at each detection cycle, from the position information about the contact position supplied from the touch panel 10 at each detection cycle, and the position information of the reference point X.

Figure 7B:
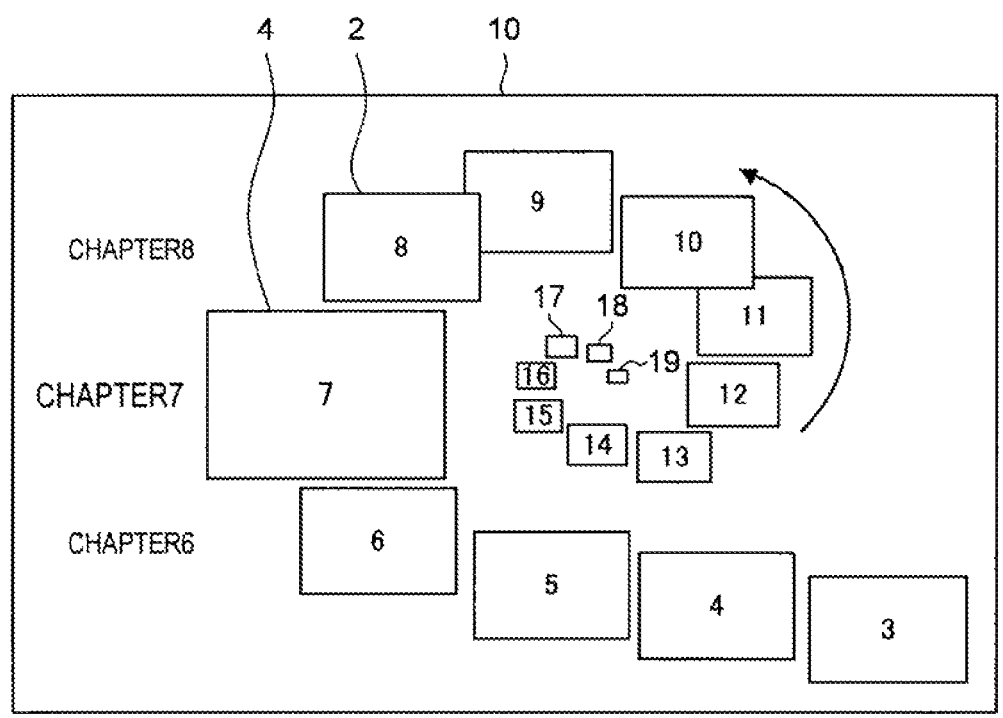
FIG. 7B is an explanatory diagram illustrating an operation (continuous movement of images) of the information display terminal.

In an example shown in FIG. 7B, the movement angle information $\Delta\alpha$ and the angular acceleration information a of the total angle of $\alpha1$ are obtained. In a similar manner to the case shown in FIG. 4B, from the state of the initial display screen, the images 2 have been moved counterclockwise by the total angle of $\alpha1$, around the reference point X as an approximate center, in a generally circumferential direction of the image spiral. In this case, the reference image has been changed to the image of chapter 7 corresponding to the total angle of $\alpha1$, and a display screen in which the images of chapter 3 to chapter 19 are set as display targets is displayed. In this situation, the example shown in FIG. 7B is different from the case shown in FIG. 4B, and even after the display screen in which the images of chapter 3 to chapter 19 are set as display targets has been displayed, the images 2 are continuously moved.

Figure 7C:
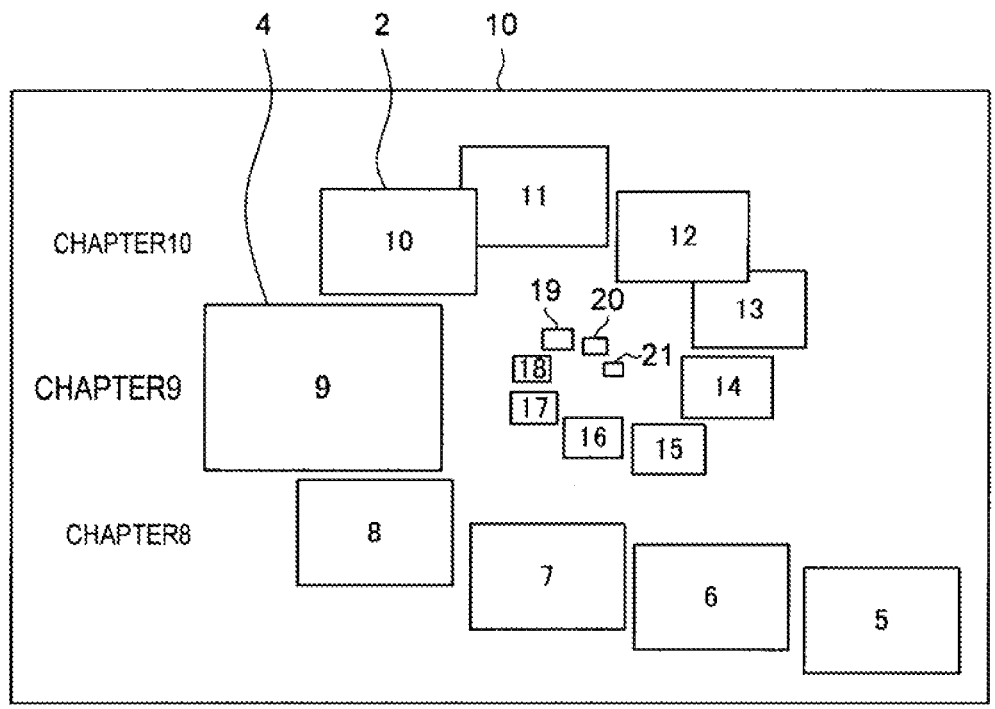
FIG. 7C is an explanatory diagram illustrating an operation (continuous movement of images) of the information display terminal.

Next, in an example shown in FIG. 7C, from the state of the display screen shown in FIG. 7B, the images 2 have been moved counterclockwise by the total angle of α3, around the reference point X as an approximate center, in a generally circumferential direction of the image spiral. In this case, the reference image has been changed from the image of chapter 7 to the image of chapter 9 corresponding to the total angle of α3, and the display processing unit 18 displays on the touch panel 10 a display screen in which the images of chapter 5 to chapter 21 are set as display targets. In this situation, the movement angle information Δα' is obtained such that the larger the angular acceleration information a is, the larger the total angle of α3 is. Note that, during a period when the reference image is shifted from the image of chapter 7 to the image of chapter 9, the movement speed of the images 2 is set stepwise such that the larger the angular acceleration information a is, the higher an initial speed is, and the movement speed is gradually reduced and finally becomes zero.

As a consequence, in accordance with the movement angle information Δα and the angular acceleration information a that are obtained from the input operation information, the images 2 are continuously moved in the generally circumferential direction of the spiral while the movement speed is gradually reduced, and thereby displayed. Thus, a particular one of the images 2 can be selected efficiently.

Therefore, by moving the input pen 30 with acceleration on the touch panel 10, the images 2 can be continuously moved and a particular one of the images 2 can be selected without any of the images 2 displayed on the touch panel 10 being obstructed by the input pen 30 and/or the hand.

Figure 7D:
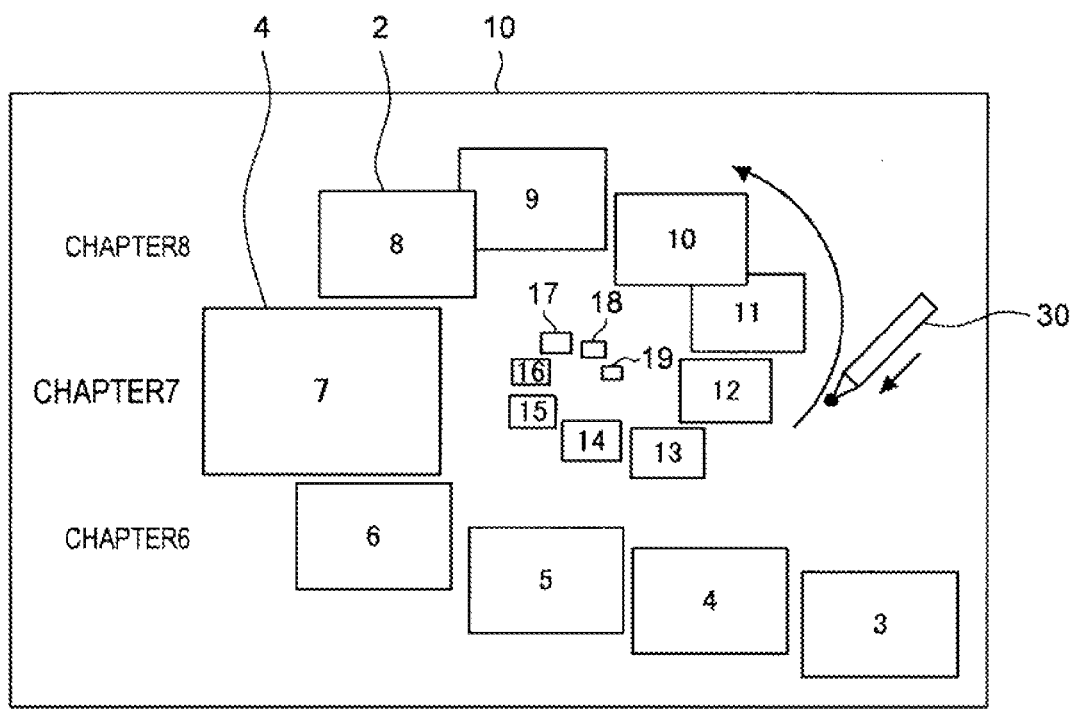
FIG. 7D is an explanatory diagram illustrating an operation (continuous movement of images) of the information display terminal.

Next, in an example shown in FIG. 7D, a movement stop instruction is input by once more touching a given position on the touch panel 10 using the input pen 30 during a period in which the state of the display screen shown in FIG. 7B shifts to the state of the display screen shown in FIG. 7C (namely, during a period in which the images 2 are continuously moved). The operation information processing unit 16 acquires movement stop information by detecting the re-contact of the input pen 30 on the touch panel 10.

Figure 7E:
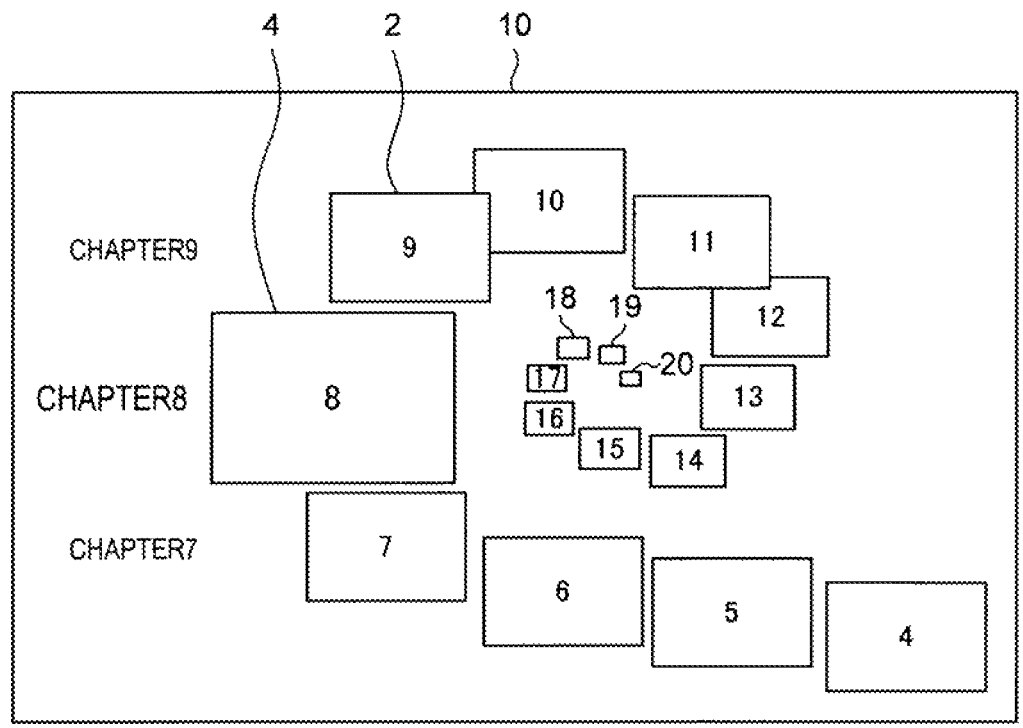
FIG. 7E is an explanatory diagram illustrating an operation (continuous movement of images) of the information display terminal.

In an example shown in FIG. 7E, the movement stop information has been acquired, and from the state of the display screen shown in FIG. 7B, the images 2 have been moved counterclockwise by an angle of α3/2, around the reference point X as an approximate center, in a generally circumferential direction of the image spiral. Here, the movement stop information has been acquired in the state where the images 2 have been moved by the angle of α3/2 in the generally circumferential direction of the image spiral, during the period in which the state of the display screen shown in FIG. 7B shifts to the state of the display screen shown in FIG. 7C. In this case, the reference image is changed from the image of chapter 7 to the image of chapter 8 corresponding to the angle of α3/2, and the display processing unit 18 displays on the touch panel 10 a display screen in which the images of chapter 4 to chapter 20 are set as display targets.

As described above, in accordance with the movement stop information that is input while the images 2 are continuously moved, the movement of the images 2 is stopped and the images 2 are displayed. Therefore, a particular one of the images 2 can be selected efficiently. Especially, while the images 2 are continuously moved, the particular one of the images 2 as a selection target can be displayed on the focus display area 36, and the continuous movement can be stopped after confirming the particular one of the images 2. Therefore, the particular one of the images 2 can be selected efficiently.

Figure 8A:
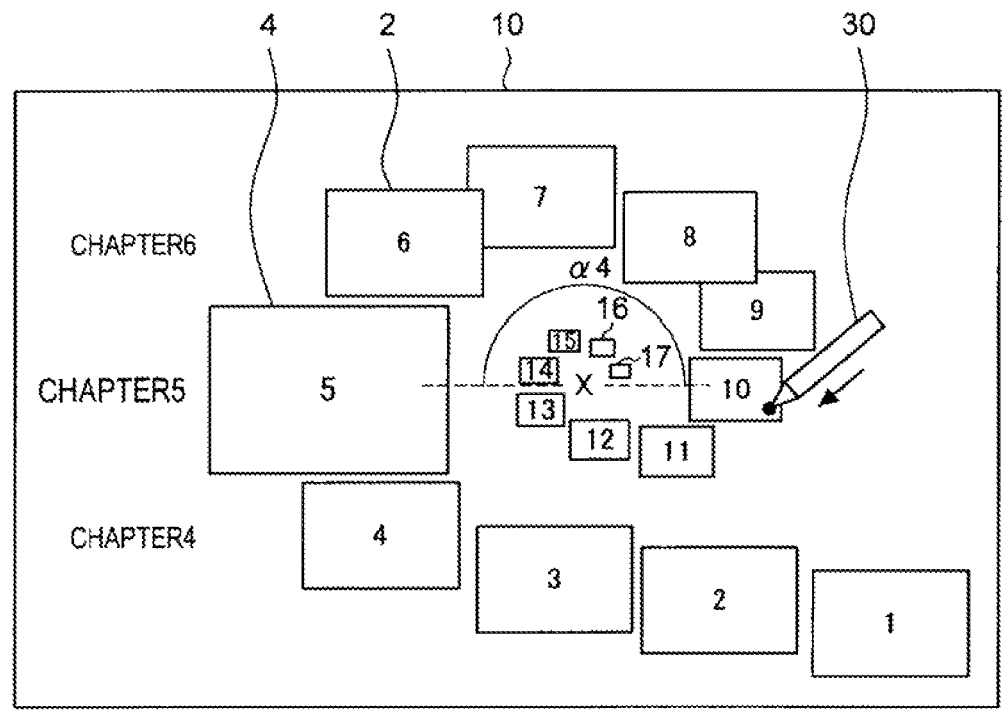
FIG. 8A is an explanatory diagram illustrating an operation (image selection) of the information display terminal.
Figure 8B:
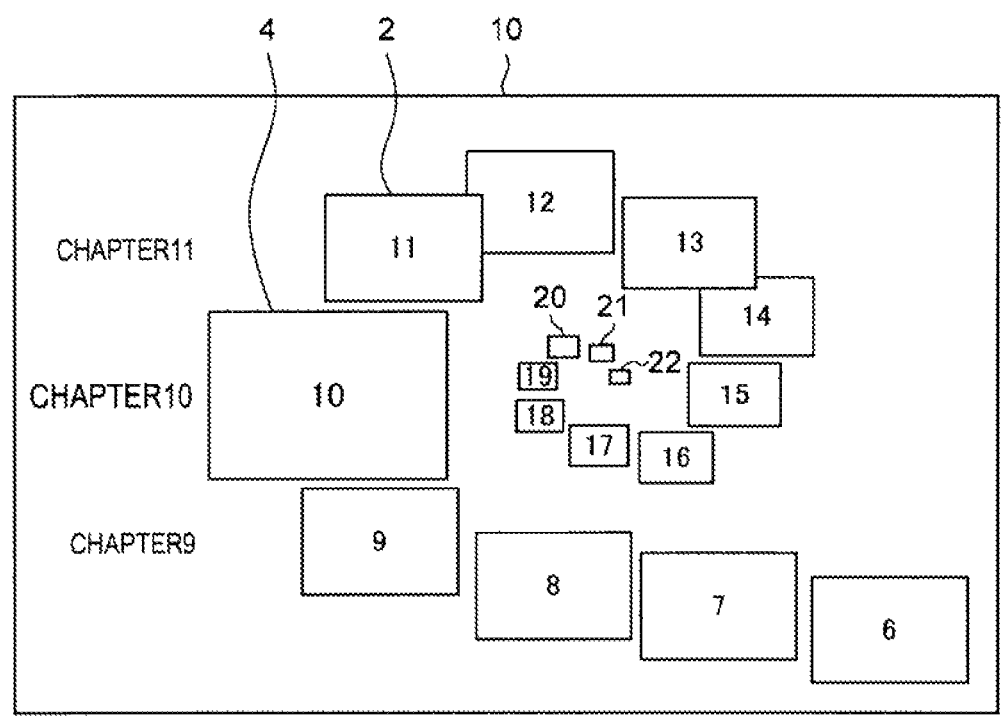
FIG. 8B is an explanatory diagram illustrating an operation (image selection) of the information display terminal.

FIG. 8A and FIG. 8B are explanatory diagrams each illustrating an operation (image selection) of the information display terminal. FIG. 8A and FIG. 8B each shows a case where in accordance with an image selection instruction that is input to the touch panel 10 to select a particular one of the images 2, the images 2 are moved in a generally circumferential direction of the image spiral from the state of the initial display screen shown in FIG. 3 and displayed, so that the particular one of the images 2 is arranged in the focus display area 36.

In an example shown in FIG. 8A, the image selection instruction is input by touching the particular one of the images 2 included in the images 2 displayed on the touch panel 10 using the input pen 30 in the state of the initial display screen. The operation information processing unit 16 acquires image selection information by detecting, on the touch panel 10, the contact of the input pen 30 with an area in which the image of chapter 10 is displayed.

In an example shown in FIG. 8B, the image selection information for selecting the image of chapter 10 as the particular one of the images 2 has been acquired. From the state of the initial display screen shown in FIG. 3, the images 2 have been moved counterclockwise by an angle of α4, around the reference point X as an approximate center, in the generally circumferential direction of the image spiral, so that the image of chapter 10 is displayed in the focus display area 36. In this case, the reference image is changed from the image of chapter 5 to the image of chapter 10 in accordance with the movement of the total angle of α4, and the display processing unit 18 displays on the touch panel 10 a display screen in which the images of chapter 6 to chapter 22 are set as display targets. Since the image of chapter 10 is displayed on the focus display area 36 in accordance with the movement stop information, the image of chapter 10 can be confirmed as the enlarged image 4. Note that, during a period in which the reference image is changed from the image of chapter 5 to the image of chapter 10, the movement speed of the images 2 may be set as a fixed speed, or may be set stepwise such that the movement speed is gradually reduced and finally becomes zero.

Thus, in accordance with the input image selection instruction, the images 2 are moved in the generally circumferential direction of the image spiral, and the selected image is arranged and displayed in the focus display area 36. Therefore, a particular one of the images 2 can be selected through intuitive operation.

When the image 4 displayed in the focus display area 36 is selected, chapter identification information included in the image attribute information and a command to transmit chapter content are transmitted to the PVR via the communication processing unit 20. Then, the information display terminal acquires the chapter content corresponding to the identification information included in the recorded program content, from the PVR via the communication processing unit 20, and causes the reproduction processing unit 22 to reproduce the chapter content.

As described above, in the information display device according to the present embodiment, in accordance with the movement angle information Δα and the angular velocity information v that are obtained from the operation information, the spirally arranged images 2 are moved in a generally circumferential direction of the spiral and displayed. Therefore, compared to a case where an up-down-left-right key or the like is used, a particular one of the images 2 can be selected through intuitive operation.

The present application contains subject matter related to that disclosed in Japanese Priority Patent Application JP 2008-175840 filed in the Japan Patent Office on Jul. 4, 2008, the entire content of which is hereby incorporated by reference.

Although a preferred embodiment of the present invention is described in the foregoing with reference to the drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

What is claimed is:

1. An information display device, comprising:
    an image display unit that displays a plurality of images, of which more than one of the plurality of images are associated with a plurality of titles, in a spiral manner according to a predetermined order;
    an operation information input unit that inputs operation information for the plurality of images; and
    a display processing unit that displays
        the plurality of images on the image display unit such that, in accordance with movement angle information and angular velocity information obtained from the operation information, the plurality of images are moved in a generally circumferential direction of a spiral formed of the plurality of images;
        a title display area arranged on the image display unit for displaying a plurality of titles on the left or right side, according to the preference of a user of the information display device; and
        an enlarged display area at a predetermined position of the image display unit, abutting the title display area and in which at least one of the plurality of images is enlarged and displayed next to the associated title among the plurality of titles displayed,
        wherein the plurality of titles in the title display area are displayed in a circular pattern and display size of a title of the plurality of titles in the title display area is displayed larger the closer the associated image is to the enlarged display area.

2. The information display device according to claim 1, wherein the display processing unit displays the plurality of images on the image display unit such that, in accordance with the movement angle information and the angular velocity information obtained from the operation information,
    the plurality of images are moved in the generally circumferential direction of the spiral formed of the plurality of images,
    the titles arranged in the title display area are displayed larger and more brightly the closer the associated image is to the enlarged display area, and
    the image arranged in the enlarged display area is enlarged and displayed in accordance with the movement of the plurality of images.

3. The information display device according to claim 2, wherein
    the display processing unit displays the plurality of images on the image display unit such that, in accordance with the movement angle information and the angular velocity information obtained from the operation information that is consecutively input, the plurality of images are consecutively moved in the generally circumferential direction of the spiral formed of the plurality of images.

4. The information display device according to claim 2, wherein
    the display processing unit displays the plurality of images on the image display unit such that, in accordance with the movement angle information and the angular velocity information obtained from the operation information, the plurality of images are continuously moved in the generally circumferential direction of the spiral formed of the plurality of images, and movement speed is gradually reduced.

5. The information display device according to claim 4, wherein the display processing unit displays the plurality of images on the image display unit such that, while the plurality of images are continuously moved in the generally circumferential direction of the spiral formed of the plurality of images, the movement of the plurality of images is stopped in accordance with a movement stop instruction that is input as the operation information to stop the movement.

6. The information display device according to claim 2, wherein the display processing unit displays the plurality of images on the image display unit such that, in accordance with an image selection instruction that is input as the operation information to select one of the plurality of images, the plurality of images are moved in the generally circumferential direction of the spiral formed of the plurality of images and the selected one of the images is arranged in the enlarged display area.

7. The information display device according to claim 2, wherein
    the display processing unit displays the plurality of images on the image display unit such that, in the order of the predetermined order of the plurality of images, a first image is larger than a second image, and the first image is brighter than the second image.

8. The information display device according to claim 2, wherein
    the title display area is arranged on either the left or right side of the image display unit according to a user setting based on whether the user is left-handed or right-handed.

9. The information display device according to claim 1, wherein
    the plurality of images are spirally arranged according to a time series order.

10. The information display device according to claim 1, wherein
    the image display unit and the operation information input unit are one of a touch panel and a touch screen.

11. An information display method for displaying a plurality of images in a spiral manner according to a predetermined order, the information display method comprising the steps of:
    inputting operation information for the plurality of images;
    displaying the plurality of images such that the plurality of images are moved in a generally circumferential direction of a spiral formed of the plurality of images, in accordance with movement angle information and angular velocity information obtained from the operation information;
    acquiring titles associated with the plurality of images;
    displaying a plurality of titles associated with the plurality of images being moved on the left or right side, according to the preference of a user of the information display device; and
    an enlarged display area, at a predetermined position of the image display unit, abutting the title display area and in which at least one of the plurality of images is enlarged and displayed next to the associated title among the plurality of titles displayed, wherein the plurality of titles in the title display area are displayed in a circular pattern and display size of a title of the plurality of titles in the title display area is displayed larger the closer the associated image is to the enlarged display area.

12. The information display method according to claim 11, further comprising the step of
displaying the plurality of images on the image display unit such that, in accordance with the movement angle information and the angular velocity information obtained from the operation information,
the plurality of images are moved in the generally circumferential direction of the spiral formed of the plurality of images,
the titles arranged in the title display area are displayed larger and more brightly the closer the associated image is to the enlarged display area, and
the image arranged in the enlarged display area is enlarged and displayed in accordance with the movement of the plurality of images.

13. The information display method according to claim 12, further comprising the step of
displaying the plurality of images such that, in accordance with the movement angle information and the angular velocity information obtained from the operation information that is consecutively input, the plurality of images are consecutively moved in the generally circumferential direction of the spiral formed of the plurality of images.

14. The information display method according to claim 12, further comprising the step of
displaying the plurality of images on the image display unit such that, in accordance with the movement angle information and the angular velocity information obtained from the operation information, the plurality of images are continuously moved in the generally circumferential direction of the spiral formed of the plurality of images, and movement speed is gradually reduced.

15. A non-transitory computer-readable medium containing program instructions that cause a computer to execute an information display method for displaying a plurality of images in a spiral manner according to a predetermined order, wherein
the information display method comprises:
inputting operation information for the plurality of images;
displaying the plurality of images such that the plurality of images are moved in a generally circumferential direction of a spiral formed of the plurality of images, in accordance with movement angle information and angular velocity information obtained from the operation information;
acquiring titles associated with the plurality of images;
displaying a plurality of titles associated with the plurality of images being moved on the left or right side, according to the preference of a user of the information display device; and
an enlarged display area, at a predetermined position of the image display unit, abutting the title display area and in which at least one of the plurality of images is enlarged and displayed next to the associated title among the plurality of titles displayed,
wherein the plurality of titles in the title display area are displayed in a circular pattern and display size of a title of the plurality of titles in the title display area is displayed larger the closer the associated image is to the enlarged display area.

16. The program instructions of claim 15, further comprising displaying the plurality of images on the image display unit such that, in accordance with the movement angle information and the angular velocity information obtained from the operation information,
the plurality of images are moved in the generally circumferential direction of the spiral formed of the plurality of images,
the titles arranged in the title display area are displayed larger and more brightly the closer the associated image is to the enlarged display area, and
the image arranged in the enlarged display area is enlarged and displayed in accordance with the movement of the plurality of images.

17. The program instructions of claim 16, further comprising displaying the plurality of images such that, in accordance with the movement angle information and the angular velocity information obtained from the operation information that is consecutively input, the plurality of images are consecutively moved in the generally circumferential direction of the spiral formed of the plurality of images.

18. The program instructions of claim 16, further comprising
displaying the plurality of images on the image display unit such that, in accordance with the movement angle information and the angular velocity information obtained from the operation information, the plurality of images are continuously moved in the generally circumferential direction of the spiral formed of the plurality of images, and movement speed is gradually reduced.

19. The program instructions of claim 18, further comprising
displaying the plurality of images on the image display unit such that, while the plurality of images are continuously moved in the generally circumferential direction of the spiral formed of the plurality of images, the movement of the plurality of images is stopped in accordance with a movement stop instruction that is input as the operation information to stop the movement.

20. The program instructions of claim 16, further comprising
displaying the plurality of images on the image display unit such that, in accordance with an image selection instruction that is input as the operation information to select one of the plurality of images, the plurality of images are moved in the generally circumferential direction of the spiral formed of the plurality of images and the selected one of the images is arranged in the enlarged display area.

* * * * *